No. 634,707. Patented Oct. 10, 1899.
L. STURGES.
BICYCLE, &c.
(Application filed July 15, 1897.)
(No Model.) 2 Sheets—Sheet 1.
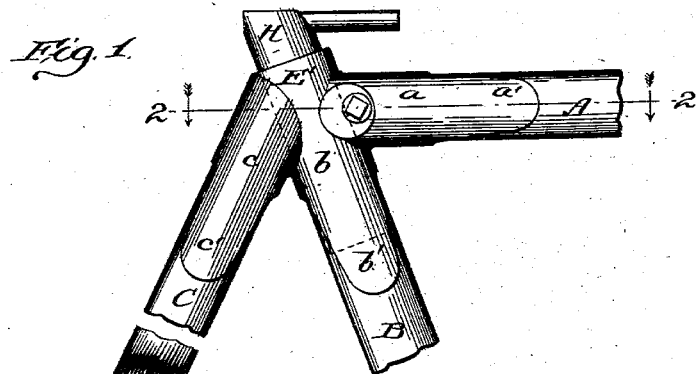
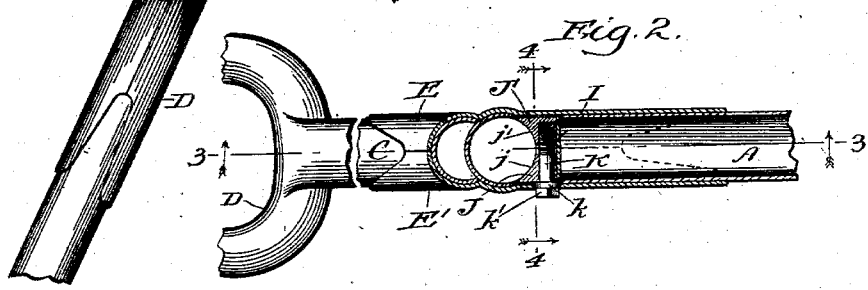
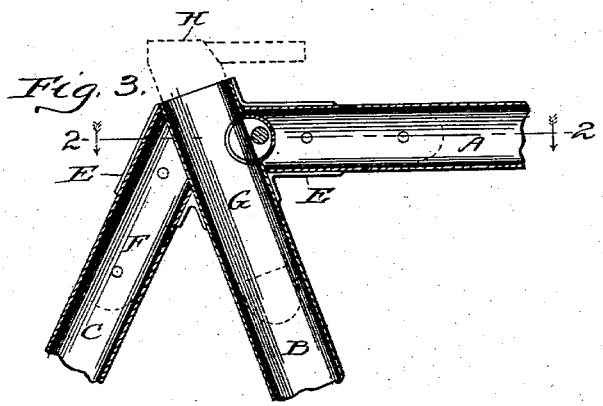
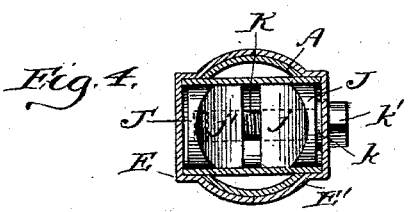
Witnesses
Martin H. Olsen.
S. Cross.
Inventor
Lee Sturges
By Gidley & Hopkins
Attorneys No. 634,707. Patented Oct. 10, 1899.
L. STURGES.
BICYCLE, &c.
(Application filed July 15, 1897.)

(No Model.) 2 Sheets—Sheet 2.

Witnesses
Martin H. Olsen.
I. Cross.

Inventor
L. Sturges
By Gialey & Hopkins
Attorneys

UNITED STATES PATENT OFFICE.

LEE STURGES, OF CHICAGO, ILLINOIS.

BICYCLE, &c.

SPECIFICATION forming part of Letters Patent No. 634,707, dated October 10, 1899.

Application filed July 15, 1897. Serial No. 644,663. (No model.)

*To all whom it may concern:*

Be it known that I, LEE STURGES, a citizen of the United States, residing at Chicago, in the county of Cook and State of Illinois, have invented certain new and useful Improvements in Bicycles and other Machines, of which the following is a specification.

The present invention relates to the means for so securing a stem or post or similar part of a machine in a socket in another part of the machine that at will the parts may be easily and quickly separated or secured together and when secured together the joint will have for practical purposes all the firmness and stability of a permanent joint.

The invention is especially applicable to the seat-post or the handle-bar stem of a bicycle of modern construction.

The invention consists in the features of novelty which are herein fully described, and in order that it may be fully understood I will describe it with reference to the accompanying drawings, which are made a part of this specification, and in which—

Figure 5:
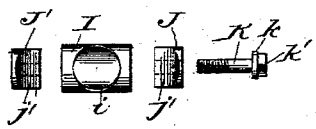
Figure 6:
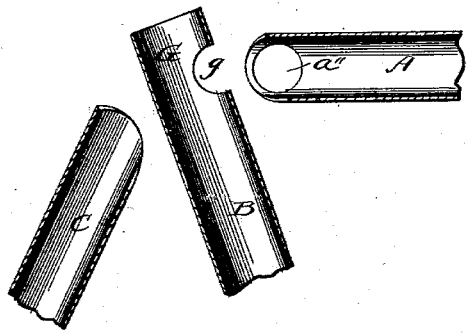
Figure 7:
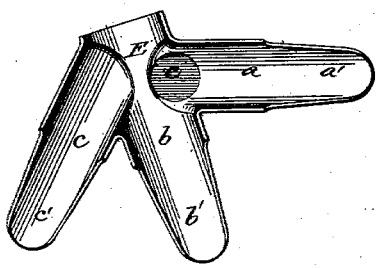
Figure 8:
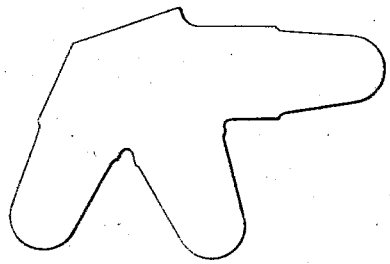

Figure 1 is a side elevation of a portion of the frame of a machine embodying the invention. Fig. 2 is a horizontal section thereof on the line 2 2, Figs. 1 and 3, looking in the direction of the arrows. Fig. 3 is a vertical longitudinal section thereof on the line 3 3, Fig. 2, looking in the direction of the arrow. Fig. 4 is an enlarged vertical transverse section thereof on the line 4 4, Fig. 2, looking in the direction of the arrow. Fig. 5 is an elevation showing in detail and separated the several parts of the device for holding the seat-post or other part. Fig. 6 is a longitudinal section showing in detail and separated fragments of the three frame-sections that are to be permanently united. Fig. 7 is an inner face view of one of the two parts of the fitting which enters into the construction of the permanent joint by which the parts shown in Fig. 6 are united. Fig. 8 is a diagram showing approximately the shape of a sheet-metal blank from which the part of the fitting shown in Fig. 7 is made.

A, B, and C are fragments of three frame-sections that are permanently united by a joint embodying the invention. As shown in the drawings, these parts are respectively the upper reach, the king-post, and the stem of the rear fork D of a bicycle; but, as before intimated, the invention is not limited to embodiment in a joint for uniting these identical parts. It is true that the improved joint is especially well adapted for uniting them and that the invention was prompted by the necessity for a satisfactory joint for this purpose, and while I claim specifically this particular embodiment of the invention still I desire to have it understood that in its broadest aspect the invention is not limited thereto, but, on the contrary, comprehends a joint having the novel features herein described regardless of the character of the machine in which it is incorporated. With this understanding for the sake of brevity the following description will be confined to the identical construction shown in the drawings, referring to the several parts by the terms appropriate to them, respectively.

The upper end of the king-post is not split; but, on the contrary, it is of invariable diameter. The rear end of the upper reach abuts against the front side of the king-post, and in order to give it a firm bearing thereon it is notched so as to conform exactly to the surface thereof. The upper end of the fork-stem abuts against the rear side of the king-post, and in order to give it a firm bearing thereon it is notched and dressed to conform to the surface thereof. These three frame-sections all lie in the same plane, the sections A and C proceeding from the section B in different directions. Surrounding the adjacent portions of the sections A, B, and C is a fitting made of sheet metal and in two parts E and E'. These parts are of similar construction, excepting that they are in reverse. They are drawn or stamped out of sheet metal, the shape of the blank from which either of them is made being approximately represented in Fig. 8. When in place, taken together, they constitute the fitting comprising a socket *a*, which completely surrounds the reach A, a pair of tongues *a'*, proceeding forward from the socket and lying against the opposite sides of the reach, a socket *b*, which completely surrounds the king-post, a pair of tongues *b'*, proceeding downward from the socket and lying against the sides of the king-post, a socket *c*, which completely surrounds the stem C, and a pair of tongues *c'*, proceeding downward from the socket and lying against the sides of the stem. Each of the two parts E E' comprises one-half of each of these sockets and one of each of the three pairs of tongues. When the parts are first assembled, they may be temporarily secured in place by means of rivets F; but for permanently uniting them all of the meeting surfaces are brazed or welded.

In a bicycle of modern construction the upper end of the king-post constitutes the socket G for the seat-post H. This socket has a lateral opening g, through which it communicates with an auxiliary socket, and in this auxiliary socket is disposed means adapted to reach into the main socket for engaging the seat-post and holding it in place. The auxiliary socket is disposed in one of the frame-sections, preferably the upper reach A, and consists of a tube I, which passes transversely through said frame-section, and means for closing its ends. The tube may be of any desired cross-sectional shape and has in one of its sides an opening i registering with the opening g of the main socket, the opening i being formed by cutting away one side of the tube I upon a circle the axis of which is perpendicular to the axis of the tube I and the diameter of which is equal to the diameter of the interior of the main socket G.

For the purpose of holding the seat-post I prefer to use a pair of jaws J J', which are disposed in the auxiliary socket and are shaped at j j', respectively, to conform to the seat-post. One of these jaws, J, is perforated for the easy passage of a screw K, while the other is tapped to receive the threaded end of the screw. The screw has a shoulder k, which bears upon the jaw J. Beyond the shoulder the screw is provided with a polygonal head k' for receiving a wrench for turning it. When the screw is turned in one direction, the two jaws are drawn together, sufficient space being left between them to permit them to be drawn firmly against the seat-post and clamp it between them and the inner surface of the main socket. On the other hand, sufficient space is left between the jaws and the ends of the auxiliary socket to permit them to be separated far enough to release the seat-post.

As shown in the drawings, the opening i embraces fully one-half of the diameter of the tube I, and the object of this is to permit the jaws J and J' to be inserted through the opening i after the tube I is secured in place in the frame. This is not essential, however, and, if desired, the opening may be shallower, in which case it is necessary to insert the jaws within the tube I before the tube is secured in place in the frame. In order to secure the tube in place, the upper reach A is provided with seats a'' for receiving the ends of the tube. Depending upon the number of degrees of the tube I that are embraced by the opening i, and consequently the distance between the centers of the tube and the main socket G, these seats a'' may take the form of notches of circular outline or they may take the form of perforations, as shown in Fig. 6. At any rate the ends of the tube pass completely through them and are squared off, and the auxiliary socket, of which the tube forms the principal part, is completed by the fitting E E'. In order to accommodate the squared ends of the tube I, the two parts of the fitting are provided with internal depressions e, which, being formed by offsetting the metal of which the fitting is made, result in external bosses. This embossed feature might be dispensed with, but I prefer to use it, since it provides shoulders against which the ends of the tube bear and which aid in preventing the lateral displacement of the tube. It will be seen that the tube and the portions of the fitting by which its ends are closed result in a socket which is completely closed save for the opening i, through which it communicates with the main socket, and a circular opening in one of the bosses e, through which the screw K passes, leaving its head exposed for the reception of a wrench for turning it.

Having thus described my invention, the following is what I claim as new therein and desire to secure by Letters Patent:

A bicycle-frame having in the king-post a socket provided with a lateral opening communicating with the interior of an adjacent tubular frame-section, a tube disposed transversely within said frame-section, seats formed on the frame-section and engaging the ends of the tube, means, disposed within said tube, adapted to reach into the socket aforesaid for engaging and holding the seat-post, and means for operating said holding means, substantially as described.

LEE STURGES.

Witnesses:
 N. C. GRIDLEY,
 L. M. HOPKINS.